United States Patent
Maichl et al.

(10) Patent No.: US 9,441,758 B2
(45) Date of Patent: Sep. 13, 2016

(54) VALVE DEVICE, VALVE ASSEMBLY AND METHOD FOR CALIBRATING A VALVE ASSEMBLY

(71) Applicant: FESTO AG & Co. KG, Esslingen (DE)

(72) Inventors: Martin Maichl, Salach (DE); Martin Meier, Hilterfingen (CH); Andreas Dickhoff, Kirchheim (DE)

(73) Assignee: FESTO AG & CO. KG, Esslingen (DE)

( * ) Notice: Subject to any disclaimer, the term of this patent is extended or adjusted under 35 U.S.C. 154(b) by 286 days.

(21) Appl. No.: 14/097,699

(22) Filed: Dec. 5, 2013

(65) Prior Publication Data

US 2014/0158215 A1 Jun. 12, 2014

(30) Foreign Application Priority Data

Dec. 12, 2012 (EP) .................................... 12008283

(51) Int. Cl.
| | |
|---|---|
| *G01L 27/00* | (2006.01) |
| *G01L 27/02* | (2006.01) |
| *G01L 15/00* | (2006.01) |
| *F16K 37/00* | (2006.01) |
| *F15B 19/00* | (2006.01) |

(52) U.S. Cl.
CPC ......... *F16K 37/0091* (2013.01); *F15B 19/005* (2013.01); *F15B 2211/30575* (2013.01); *F15B 2211/6306* (2013.01); *F15B 2211/6309* (2013.01); *F15B 2211/6313* (2013.01); *F15B 2211/8855* (2013.01); *Y10T 137/0402* (2015.04); *Y10T 137/8175* (2015.04)

(58) Field of Classification Search
CPC .... G01L 27/005; G01L 27/002; G01L 15/00
USPC ................................ 73/1.57, 1.71–1.72, 168
See application file for complete search history.

(56) References Cited

U.S. PATENT DOCUMENTS

| | | | |
|---|---|---|---|
| 4,576,035 | A | 3/1986 | Hooven et al. |
| 2006/0174700 | A1* | 8/2006 | Fischer ........................ 73/117.2 |
| 2007/0234812 | A1 | 10/2007 | Seid et al. |
| 2008/0066522 | A1 | 3/2008 | Thiel et al. |
| 2011/0144888 | A1* | 6/2011 | Rollinger et al. ............ 701/103 |
| 2011/0214505 | A1* | 9/2011 | Aoki et al. ...................... 73/727 |

FOREIGN PATENT DOCUMENTS

| | | |
|---|---|---|
| DE | 102005036663 | 2/2007 |
| EP | 1245812 | 10/2002 |

* cited by examiner

*Primary Examiner* — Robert Huber
*Assistant Examiner* — Anthony W Megna Fuentes
(74) *Attorney, Agent, or Firm* — Hoffman & Baron, LLP

(57) ABSTRACT

A valve device including a valve housing which bounds a valve chamber in which a valve member is accommodated for movement between a blocking position and a release position in order to influence a free flow cross-section for a fluid in a flow path between an inlet passage terminating into the valve chamber and an outlet passage leading from the valve chamber, further including a first absolute pressure sensor for providing a first pressure signal as a function of an operating pressure in the flow path, and further including an evaluation circuit for processing the first pressure signal. It is provided that a second absolute pressure sensor is located outside the flow path, which is designed to provide a second pressure signal as a function of an operating pressure outside the flow path and which is connected to the evaluation circuit for enabling a differential pressure between the first and second pressure signals to be determined.

9 Claims, 1 Drawing Sheet

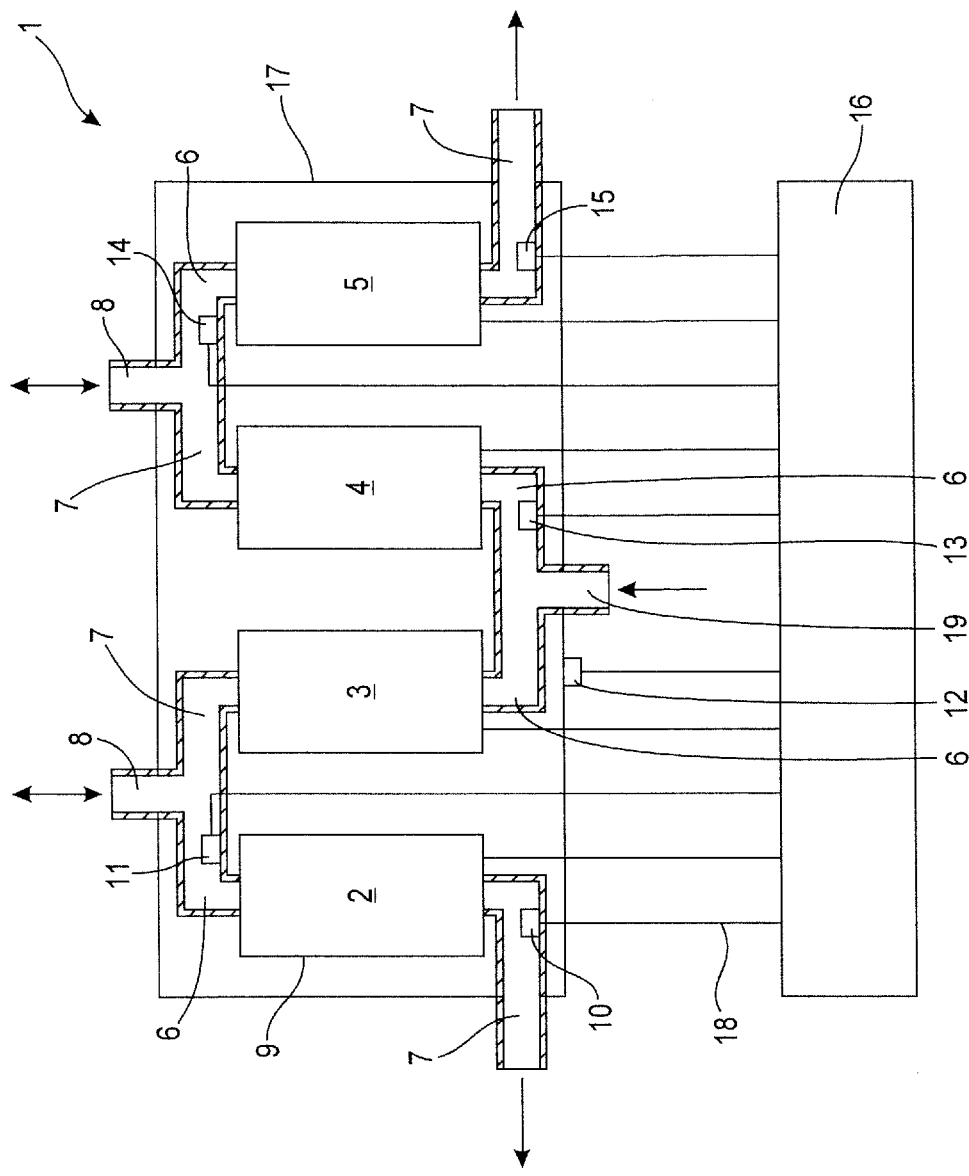
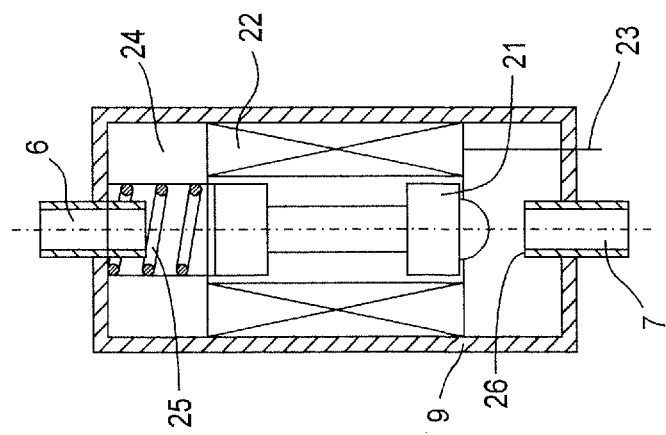
Fig. 1
Fig. 2

VALVE DEVICE, VALVE ASSEMBLY AND METHOD FOR CALIBRATING A VALVE ASSEMBLY

BACKGROUND OF THE INVENTION

The invention relates to a valve device comprising a valve housing which bounds a valve chamber in which a valve member is accommodated for movement between a blocking position and a release position in order to influence a free flow cross-section for a fluid in a flow path between an inlet passage terminating into the valve chamber and an outlet passage leading from the valve chamber, further comprising a first absolute pressure sensor for providing a first pressure signal as a function of an operating pressure in the flow path, and further comprising an evaluation circuit for processing the first pressure signal. The invention further relates to a valve assembly comprising a plurality of such valve devices and to a method for calibrating such a valve assembly.

From DE 10 2005 036 663 A1, a so-called mechatronics unit is known, wherein a mechanical component and an electronic component are placed in a housing, the mechanical component comprising one or more solenoid valves and pressure ducts, while the electronic component comprises a printed circuit board with electronic components. Sensor modules for measuring physical variables are installed into the pressure ducts, the sensor modules being absolute pressure sensors or differential pressure sensors as required.

SUMMARY OF THE INVENTION

The invention is based on the problem of providing a valve device, a valve assembly comprising a plurality of valve devices and a method for calibrating such a valve assembly, which is designed for an automated checking of the operation of the absolute pressure sensors.

This problem is solved for a valve device of the type referred to above by the features of claim 1. According to this, it is provided that a second absolute pressure sensor is located outside the flow path, which is designed to provide a second pressure signal as a function of a reference pressure outside the flow path and which is connected to the evaluation circuit for enabling a differential pressure between the first and second pressure signals to be determined With the aid of this determined differential pressure, information on the pressure conditions in the flow path and on the function of the absolute pressure sensors involved, in particular of the first absolute pressure sensor, can be obtained, possibly using a knowledge about the operating position of the valve member between the blocking position and the release position. With this information, the pressure signals made available by the first absolute pressure sensor can be checked and the first absolute pressure sensor can be monitored automatically, in particular in predetermined time intervals. This is for example relevant if the valve device is subject to strict safety requirements which demand the checking of the valve function, for example by means of determining different operating pressures in the flow path at different operating positions of the valve member. If only a single absolute pressure sensor placed in the flow path is used, there is an increased risk of erroneous measurements, in particular that a deviation might not be recognised, than if the first pressure signals of the absolute pressure sensor are balanced by the pressure signals of at least one second absolute pressure sensor.

Advantageous further developments of the invention are specified in the dependent claims.

It is expedient if the first absolute pressure sensor is located in the valve chamber or in the outlet passage in order to make available a first pressure signal depending on an operating position of the valve member to the evaluation circuit. If the first absolute pressure sensor is located in the valve chamber, it can, depending on the mechanical configuration of the valve device, measure either the supply pressure which continuously prevails in the valve chamber and which is made available through the inlet passage, or an outlet pressure prevailing in the outlet passage. In any case, as the valve member moves from the blocking position into the release position, either a pressure drop or a pressure increase can be detected by the first absolute pressure sensor. This depends on whether a valve seat, against which the valve member can bear in the blocking position while forming a seal, is located upstream or downstream of the valve chamber and the first absolute pressure sensor located therein. If the first absolute pressure sensor is located in the outlet passage, it is basically located downstream of the valve seat, with which the valve member forms a seal in the blocking position, thereby allowing in the blocking position of the valve member a determination of the operating pressure prevailing in the operating passage and therefore essentially applied to a load connected to the operating passage.

The second absolute pressure sensor is preferably located on an outer surface of the valve housing, in order to make available a second pressure signal dependent on ambient pressure to the evaluation circuit. In this way, using the second absolute pressure sensor, a differential pressure can be calculated between the operating pressure in the flow path and the ambient pressure detected as reference pressure, on the basis of which for example a motion behaviour of an actuator to which fluid pressure is applied or a suction power of a suction gripper supplied with vacuum by the valve device can be checked. In addition or as an alternative, by determining the differential pressure between the first and the second pressure signal, the pressure signals of the first and the second absolute pressure sensor can be compared directly in a suitable operating position of the valve member, for example in order to correct in a subsequent step the pressure signals detected by the first absolute pressure sensor.

In a further development of the invention, it is provided that the first absolute pressure sensor is located in the outlet passage and a third absolute pressure sensor is located in the inlet passage or in the valve chamber, in order to make available a third pressure signal dependent on an inlet pressure in the inlet passage or on an operating pressure in the valve chamber to the evaluation circuit. Like the second absolute pressure sensor, the third absolute pressure sensor is designed to make available pressure signals which allow the pressure signals of the first absolute pressure sensor to be checked. With a suitable configuration of the valve device, we can for example start with an arrangement in which the first and third absolute pressure sensors make available identical pressure signals to the evaluation circuit as the valve member moves into the release position. Accordingly, if the operating position of the valve member is known, the first absolute pressure sensor can be checked using the pressure signals of the third absolute pressure sensor. In addition or as an alternative, this can be balanced using the pressure signals of the second absolute pressure sensor for allowing an absolute pressure sensor, in this case the third absolute pressure sensor, to be checked. In accordance with this, the evaluation circuit can be designed for balancing the first and second absolute pressure sensors or the first and third absolute pressure sensors or the second and third absolute pressure sensors as a function of an operating position of the valve member.

In an advantageous further development of the invention, it is provided that the absolute pressure sensor and/or the evaluation circuit comprise(s) analogue-to-digital converter means for an AD conversion of measuring signals, in particular pressure signals and/or temperature signals, and/ or a memory device for storing measuring signal values, in particular pressure signal values and/or temperature signal values, or of measuring signal values and time stamps assigned to the measuring signal values. Using the analogue-to-digital converter means, the typically analogue measuring signals, in particular in the form of an electric voltage or an electric current, for example pressure signals and/or temperature signals, can be converted for digital further processing. This is particularly relevant if individual or all measuring signals are to be stored in a memory device at regular or irregular time intervals, for example in order to observe a long-term change in the pressure signals of individual absolute pressure sensors and to output corresponding error messages if applicable. For this purpose, it may be particularly advantageous if individual or all measuring signal values, in particular pressure signal values, are stored in the memory device with time stamps, i.e. time data relating to the detection of the respective measuring signal value, in particular the pressure signal value. The use of time stamps for the pressure signal values is particularly relevant if the pressure signal values are stored at irregular time intervals or only as a function of presettable operating positions of the valve member or of other external circumstances.

In a further variant of the invention, it is provided that the first absolute pressure sensor has a measuring range which is two to five times as large as the measuring range of the second absolute pressure sensor. The second absolute pressure sensor is typically provided for determining an ambient pressure in the surroundings of the valve device, and it can further be assumed that this ambient pressure fluctuates within a tight interval, for example in a range of 1 bar +/−200 millibars, so that a measuring range of, for example, 0 to 2 bars is sufficient for the second absolute pressure sensor, unless the valve device with the absolute pressure sensors contained therein is used in a vacuum or high-pressure range. The first absolute pressure sensor will for example have a typical measuring range of 0 to 10 bars for pneumatic applications, so that the pressure of 6 bars commonly provided in pneumatic systems can be measured without any difficulties.

It is advantageous if the absolute pressure sensor includes an internal vacuum chamber of which sections are closed by a measuring diaphragm, with a deformation sensor or a deformation sensor and a temperature sensor being provided on the measuring diaphragm for detecting a pressure-dependent or a pressure- and temperature-dependent deformation of the measuring diaphragm and for generating from this at least one—in particular a temperature-compensated-pressure signal. Such an absolute pressure sensor can for example be produced cost-effectively for highly precise and fast pressure measurement using the methods of semiconductor production and/or MEMS processes (production processes for so-called "micro-electro-mechanical systems"), and it in particular comprises a measuring diaphragm to which a piezoresistive sensor is applied. Furthermore, on the measuring diaphragm or in its immediate vicinity, a temperature sensor may be provided which is used for the temperature compensation of the pressure signal detected by the measuring diaphragm.

According to a second aspect of the invention, a valve assembly is provided for solving the above problem, which valve assembly comprises a plurality of valve devices according to any of claims 1 to 8, wherein each of the valve devices comprises a first or a first and a third absolute pressure sensor and wherein several valve devices comprise a common second absolute pressure sensor. In this way, at least the first pressure signal can in each of the valve devices be detected individually with the aid of a corresponding first absolute pressure sensor and balanced by means of the central second absolute pressure sensor. This results in a cost-effective structure for a suitably equipped valve assembly.

According to a third aspect, the problem of the invention is solved by a method for calibrating a valve assembly according to claim 9, in which at least two pressure values from the group: ambient pressure, determined from the second pressure signal of the second absolute pressure sensor; first operating pressure, determined in the flow path between the inlet passage and the outlet passage by means of the first pressure signal of the first absolute pressure sensor at a first presettable operating position of the valve member; second operating pressure, determined in the flow path between the inlet passage and the outlet passage by means of the first pressure signal of the first absolute pressure sensor at a second presettable operating position of the valve member which differs from the first operating position of the valve member; third operating pressure, determined in the flow path between the inlet passage and the outlet passage by means of the third pressure signal of the third absolute pressure sensor at a first presettable operating position of the valve member; fourth operating pressure, determined in the flow path between the inlet passage and the outlet passage by means of the third pressure signal of the third absolute pressure sensor at a second presettable operating position of the valve member which differs from the first operating position of the valve member; are determined, followed by a determination of a correction value for the first absolute pressure sensor using the detected differential pressures between the ambient pressure and the first operating pressure and/or between the ambient pressure and the second operating pressure and/or between the first operating pressure and the third operating pressure and/or between the second operating pressure and the fourth operating pressure; and/or a determination of a correction value for the third absolute pressure sensor using the detected differential pressures between the ambient pressure and the third operating pressure and/or between the ambient pressure and the fourth operating pressure and/or between the first operating pressure and the third operating pressure and/or between the second operating pressure and the fourth operating pressure; in the evaluation circuit. This method can therefore in particular be used in monitoring a valve assembly and allows an internal readjustment of the absolute pressure sensors used.

BRIEF DESCRIPTION OF THE DRAWINGS

An advantageous embodiment of the invention is illustrated in the drawing, of which:

FIG. 1 shows a valve assembly comprising a plurality of valve devices and a plurality of absolute pressure sensors; and FIG. 2 is a diagrammatic sectional view of a valve device.

DETAILED DESCRIPTION OF THE PREFERRED EMBODIMENTS

A valve assembly 1 shown in FIG. 1 comprises in the illustrated embodiment four valve devices 2 to 5, which in the illustrated embodiment are connected to one another in a fluidic bridge circuit. According to FIGS. 1 and 2, each valve device 2 to 5 has an inlet passage 6 and an outlet passage 7. The inlet passages 6 of the valve devices 3 and 4 shown in FIG. 1 are jointly provided for connection to a fluid source, in particular a compressed air source, not shown in the drawing. The outlet passages 7 of the valve devices 2 and 5 are designed as fluid outlets for discharging a pressurised fluid into the environment, in particular with the interposition of a silencer not shown in the drawing. The outlet passage 7 of the valve device 3 is connected to the inlet passage 6 of the valve device 2 for fluidic communication and is additionally connected to an operating port 8 provided for supplying fluid to and discharging fluid from a fluidic load not shown in the drawing. The same applies to the valve devices 4 and 5.

In the illustrated embodiment, several absolute pressure sensors 10 to 15, each connected to an evaluation circuit 16, are provided in the valve assembly 1. In the illustrated embodiment, electric connections between the absolute pressure sensors 10 to 15 and the evaluation circuit 16 are provided for this purpose. In an embodiment not shown in the drawing, some of the connections between the absolute pressure sensors and the evaluation circuit are contactless, in particular optical or inductive.

Each of the absolute pressure sensors 10, 11, 14 and 15 is located in the outlet passages 7 of the associated valve device 2 to 5 and should therefore be considered as first absolute pressure sensors in accordance with the definition in the patent claims. The absolute pressure sensor 12 is located on an external surface of a diagrammatically indicated valve housing 17 for the detection of an ambient pressure and should therefore be considered as a second absolute pressure sensor according to the claims. The absolute pressure sensor 13 in the inlet passage 6 of the valve device 4 should accordingly be categorised as a third absolute pressure sensor.

The valve device 2 illustrated diagrammatically in FIG. 2 comprises a valve housing 9 which bounds a valve chamber 24 into which the inlet passage 6 terminates and from which the outlet passage 7 leads off, so that a flow path through the valve device includes the inlet passage 6, the valve chamber 24 and the outlet passage 7. In the valve chamber of the illustrated embodiment, a drive 22 designed as an electrically operated solenoid and a valve member 21 driven by the drive 22 and equipped with a permanent magnet arrangement in the illustrated embodiment are provided. The valve chamber further accommodates a spring device 25 designed as a coil spring, which as a preloaded compression spring between the valve member 21 and the valve housing 9 applies a closing pressure to the valve member 21. In an end region remote from the spring device 25, the valve member 21 is matched to a geometry of a valve seat 26 formed at the outlet passage 7 in the illustrated embodiment in such a way that the flow path is blocked if the valve member 21 contacts the valve seat 26. If an electric current is applied to the drive 22 by means of a connecting line 23, a magnetic force acts on the valve member 21, thereby lifting it off the valve seat 26 against the preload of the spring device 25 and opening the flow path between the inlet passage 6 and the outlet passage 7.

The above description of the construction of the valve device 2 is provided by way of example only, and both the type of drive and the design and movement of the valve member may be different, which is for example the case when using a piezoelectric valve or a fluidically piloted valve.

In the following paragraphs, it shall be described by way of example how the pressure signals of the first, second and third absolute pressure sensors can for example be used by the evaluation circuit 16 for checking the function of the first absolute pressure sensors 10, 11, 14, 15 or for initiating correction measures. The following description is based on the assumption that the valve devices 2 to 5 are designed as normally closed (NC) valves and are only transferred from a closed position into an open operating position if selected by means of the control lines 18, to which the evaluation circuit 16 can apply actuating energy, in particular electric energy.

Unless the valve devices 2 to 5 are selected, a fluid pressure applied to the inlet passage of the valve devices 3 and 4, which can also be identified as supply port 19, is present only in these two inlet passages 6 and is measured by the absolute pressure sensor 13 and transmitted to the evaluation circuit 16. The absolute pressure sensors 10 and 15 are subject to ambient pressure, which can also be detected by the absolute pressure sensor 12. To each of the absolute pressure sensors 11 and 14, an operating pressure is applied which prevails at the corresponding operating ports 8 and depends on the characteristics of the connected fluidic loads, which are not shown in detail. This being so, at this point in time only the two absolute pressure sensors 10 and 15 can be checked by balancing their pressure signals against the pressure signals of the absolute pressure sensor 12.

At a second point in time, at which the valve device 3 is selected by way of example, the pressurised fluid applied to the supply port 19 can flow through the valve device 3 to the associated operating port 8; in this process, identical pressure conditions are set in the inlet passage 6 of the valve device 3 and in the outlet passage 7 of the valve device 3, enabling the evaluation circuit 16 to check whether the pressure signal of the third absolute pressure sensor 13 is identical to the pressure signal of the first absolute pressure sensor 11. If any differences between the two pressure signals exceed a presettable threshold value, an error message can be output, or the pressure signal from the first absolute pressure sensor 11 can be corrected, so that after this correction the two absolute pressure sensors 11 and 13 deliver the same pressure signal. This correction is based on the assumption that the absolute pressure sensor 13 is more likely to output a correct pressure signal than the absolute pressure sensor 11, because, compared to the absolute pressure sensor 11, the absolute pressure sensor 13 is subjected to a smaller bandwidth of different pressures, because the absolute pressure sensor 13 is subjected either to the substantially constant supply pressure or to a lower operating pressure which is set as the valve opens. In contrast, the absolute pressure sensor 11 and similarly the absolute pressure sensor 14 are, depending on the design of the connected fluidic loads, subjected to a multitude of pressure changes and a great bandwidth of pressure fluctuations, and therefore at a higher risk of failure than the absolute pressure sensor 13.

After the valve device 3 has closed, an opening of the valve device 2 can be provided at a third point in time, resulting in a pressure balance between the operating port 8 of the valve devices 2 and 3 and the outlet passage 7 of the valve device 2, so that the pressure signals of the absolute pressure sensors 10 and 11 located in this flow path can be compared by the evaluation circuit 16 and the pressure signal provided by the absolute pressure sensor 11 can be corrected if required.

By way of example, it may be provided that the analogue pressure signals detected by the absolute pressure sensors 10 to 15 can be converted into digital signals and as such transmitted to the evaluation circuit 16. In addition or as an alternative, it may be provided that the respective pressure signals are buffered in memory devices provided in the absolute pressure sensors 10 to 15, or alternatively held for a longer time in these memory devices for calibration purposes after being provided with time stamps. In addition or as an alternative, pressure signals of the respective absolute pressure sensors 10 to 15 can also be stored in the evaluation circuit 16. In the evaluation circuit 16, there is further performed, as described above, the balancing of pressure signals of different absolute pressure sensors 10 to 15 at different switching states of the valve devices 2 to 5, wherein it is always important that the pressure signals of different absolute pressure sensors 10 to 15 are compared at points in time when it can be assumed that the absolute pressure sensors 10 to 15 to be compared are subjected to the same operating pressure. Depending on the design of the evaluation circuit 16 and/or of the absolute pressure sensors 10 to 15, correction values determined by balancing different absolute pressure sensors 10 to 15 can be determined and stored in suitable memory devices in the evaluation circuit 16 and/or in the absolute pressure sensors 10 to 15.

The invention claimed is:

1. A valve device comprising a valve housing which bounds a valve chamber in which a valve member is accommodated for movement between a blocking position and a release position in order to influence a flow for a fluid in a flow path between an inlet passage terminating into the valve chamber and an outlet passage leading from the valve chamber, the valve device further comprising:
   a first absolute pressure sensor disposed in the outlet passage for providing a first pressure signal as a function of an operating pressure in the flow path;
   an evaluation circuit for processing the first pressure signal;
   a second absolute pressure sensor located outside the flow path, which is configured to provide a second pressure signal as a function of a reference pressure outside the flow path and which is connected to the evaluation circuit; and
   a third absolute pressure sensor disposed in the inlet passage or in the valve chamber in order to make available a third pressure signal dependent on an inlet pressure in the inlet passage or on an operating pressure in the valve chamber to the evaluation circuit,
   wherein the evaluation circuit compares the first, second and third pressure signals for enabling a differential pressure between the first, second and third pressure signals to be determined.

2. A valve assembly comprising a plurality of valve devices and an evaluation circuit, each valve device comprising a valve housing which bounds a valve chamber in which a valve member is accommodated for movement between a blocking position and a release position in order to influence a flow for a fluid in a flow path between an net passage terminating into the valve chamber and an outlet passage leading from the valve chamber, wherein each valve device further comprises a first absolute pressure sensor for providing a first pressure signal as a function of an operating pressure in the flow path, the first pressure signal being processed by the evaluation circuit, wherein a second absolute pressure sensor is located outside the flow path of each valve device, the second absolute pressure sensor being configured to provide a second pressure signal as a function of a reference pressure outside the flow path and which is connected to the evaluation circuit, the evaluation circuit comparing the first and second pressure signals for enabling a differential pressure between the first and second pressure signals to be determined, and wherein the second absolute pressure sensor is a common absolute pressure sensor shared by at least two valve devices.

3. A valve assembly according to claim 2, wherein the first absolute pressure sensor of each valve device is located in the valve chamber or in the outlet passage in order to make available a first pressure signal depending on an operating position of the valve member to the evaluation circuit.

4. A valve assembly according to claim 2, wherein the second absolute pressure sensor is located on an outer surface of the valve assembly, in order to make available a second pressure signal dependent on ambient pressure to the evaluation circuit.

5. A valve assembly according to claim 2, wherein the first absolute pressure sensor of each valve device is located in the outlet passage and a third absolute pressure sensor is located in the inlet passage or in the valve chamber of at least one valve device, in order to make available a third pressure signal dependent on an inlet pressure in the inlet passage or on an operating pressure in the valve chamber to the evaluation circuit.

6. A valve assembly according to claim 2, wherein the evaluation circuit is configured for calibrating the first and the second absolute pressure sensor or the first and a third absolute pressure sensor or the first, the second and a third absolute pressure sensor as a function of an operating position of the valve member.

7. A valve assembly according to claim 2, wherein each absolute pressure sensor and/or the evaluation circuit comprise(s) analogue-to-digital converter means for an AD conversion of measuring signals, and/or a memory device for storing measuring signal values or of measuring signal values and time stamps assigned to the measuring signal values.

8. A valve assembly according to claim 2, wherein each first absolute pressure sensor has a measuring range which is at least two to five times as large as a measuring range of the second absolute pressure sensor.

9. A method for calibrating a valve assembly according to claim 2, wherein at least two pressure values from the group: ambient pressure, determined from the second pressure signal of the second absolute pressure sensor; first operating pressure, determined in the flow path between the inlet passage and the outlet passage by means of the first pressure signal of the first absolute pressure sensor at a first presettable operating position of the valve member; second operating pressure, determined in the flow path between the inlet passage and the outlet passage by means of the first pressure signal of the first absolute pressure sensor at a second presettable operating position of the valve member which differs from the first operating position of the valve member; third operating pressure, determined in the flow path between the inlet passage and the outlet passage by means of the third pressure signal of the third absolute pressure sensor at a first presettable operating position of the valve member; fourth operating pressure, determined in the flow path between the inlet passage and the outlet passage by means of the third pressure signal of the third absolute pressure sensor at a second presettable operating position of the valve member which differs from the first operating position of the valve member; are determined, followed by a determination of a correction value for the first absolute pressure sensor using the detected differential pressures between the ambient pressure and the first operating pressure and/or between the ambient pressure and the second operating pressure and/or between the first operating pressure and the third operating pressure and/or between the second operating pressure and the fourth operating pressure; and/or a determination of a correction value for the third absolute pressure sensor using the detected differential pressures between the ambient pressure and the third operating pressure and/or between the ambient pressure and the fourth operating pressure and/or between the first operating pressure and the third operating pressure and/or between the second operating pressure and the fourth operating pressure; in the evaluation circuit.

\* \* \* \* \*